(12) United States Patent
Loce

(10) Patent No.: US 6,757,449 B1
(45) Date of Patent: Jun. 29, 2004

(54) METHODS AND SYSTEMS FOR PROCESSING ANTI-ALIASED IMAGES

(75) Inventor: Robert Paul Loce, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/441,520

(22) Filed: Nov. 17, 1999

(51) Int. Cl.$^7$ .................................................. G06K 9/32
(52) U.S. Cl. ..................... 382/299; 382/266; 382/269; 382/275; 358/1.2; 358/3.27; 345/611; 345/698
(58) Field of Search ................... 382/275, 298, 382/299, 209, 203, 204, 252, 255, 256, 260, 261, 263, 264, 265, 266–269, 274, 282, 286; 345/472, 472.2, 469.1, 470, 698, 699, 214, 611; 348/606, 607; 358/1.2, 3.07, 3.2, 3.26, 3.27, 447, 532

(56) References Cited

U.S. PATENT DOCUMENTS

| | | | | |
|---|---|---|---|---|
| 4,816,898 A | * | 3/1989 | Farley et al. ................ | 348/453 |
| 4,882,585 A | * | 11/1989 | Beard .......................... | 341/143 |
| 4,890,162 A | * | 12/1989 | McNeely et al. ...... | 375/240.21 |
| 5,007,428 A | * | 4/1991 | Watmough .................. | 600/440 |
| 5,122,884 A | * | 6/1992 | Gilbert et al. ............. | 358/3.15 |
| 5,278,678 A | * | 1/1994 | Harrington .................. | 358/518 |
| 5,408,235 A | * | 4/1995 | Doyle et al. ................ | 341/143 |
| 5,444,552 A | * | 8/1995 | Smith, III .................... | 358/465 |
| 5,553,171 A | * | 9/1996 | Lin et al. ..................... | 382/299 |
| 5,657,430 A | * | 8/1997 | Smith et al. ................ | 358/1.2 |
| 5,754,695 A | * | 5/1998 | Kuo et al. ................... | 382/228 |
| 5,828,792 A | * | 10/1998 | O'Gorman .................. | 382/263 |
| 5,999,659 A | * | 12/1999 | McCarthy et al. .......... | 382/269 |
| 6,019,363 A | * | 2/2000 | Ahn ........................ | 271/10.05 |
| 6,021,256 A | * | 2/2000 | Ng et al. ..................... | 358/1.9 |
| 6,023,535 A | * | 2/2000 | Aoki .......................... | 382/299 |
| 6,038,052 A | * | 3/2000 | Arnold et al. .............. | 359/205 |

OTHER PUBLICATIONS

Robert P. Loce and Edward R. Dougherty, *Enhancement and Restoration of Digital Documents*, Bellingham, Washington, 1997, pp. 1–22.

* cited by examiner

Primary Examiner—Bhavesh M. Mehta
Assistant Examiner—Yosef Kassa
(74) Attorney, Agent, or Firm—Oliff & Berridge, PLC

(57) ABSTRACT

The present invention discloses methods and apparatus for processing anti-aliased digital images. Specifically, the present invention describes methods and apparatus where anti-aliased images of a given pixel resolution are transformed to high resolution binary images, binary operations such as template matching are performed on the high resolution images, and then the high resolution images are transformed to anti-aliased images of a predetermined pixel resolution.

16 Claims, 5 Drawing Sheets

METHODS AND SYSTEMS FOR PROCESSING ANTI-ALIASED IMAGES

BACKGROUND OF THE INVENTION

1. Field of Invention

The invention relates to methods and systems for processing anti-aliased digital images.

2. Description of Related Art

As anti-aliased line art becomes increasingly available to the printing industry, the ability to perform the same type of processes available to binary line art on anti-aliased line art is desirable. For example, it is desirable to control the widths of lines of anti-aliased line art when converting from a first resolution to a second resolution. Additionally, processes such as document cleaning, document restoration and image enhancement are desirable for anti-aliased line art just as much as for binary line art.

SUMMARY OF THE INVENTION

This invention provides methods and systems for processing anti-aliased line art.

This invention separately provides systems and methods to extend the well developed and effective processes used in processing binary line art to anti-aliased line art.

In various exemplary embodiments of the methods and systems according to this invention, an anti-aliased, or gray-edged, image is converted to a high resolution binary image using a binary rendering technique. Once the image is in the high resolution binary form, a variety of useful operations, such as template matching, morphological filters, Boolean logic filters, threshold convolution or correlation, image filtering, or other binary operations can be performed. The modified high resolution binary image is then transformed into a lower resolution image using an anti-aliasing technique, thus providing a smooth and distortion-free anti-aliased image to the greatest extent possible.

Other features and advantages of the various exemplary embodiments of the methods and systems of this invention are described below or are apparent from the accompanying drawings and from the detailed description which follows.

BRIEF DESCRIPTION OF THE DRAWINGS

The invention is described in detail with regard to the following figures, wherein like numerals reference like elements, and wherein.

DETAILED DESCRIPTION OF PREFERRED EMBODIMENTS

This invention provides methods and systems for processing anti-aliased line art. The term "anti-aliased line art" refers to a wide range of image types including, but not limited to, text and graphics that possess gray edges, gray-scale continuous tone (contone) image data and color images wherein at least one color image separation can be treated as a gray-scale image. Furthermore, an anti-aliased image can be any binary image such as digital images, hardcopy images, page description language (PDL) images or any other descriptive form that is subsequently transformed to an anti-aliased image data. Various transformation techniques can include any processing technique capable of transforming binary images to anti-aliased images such as computer-based transformations or physical scanning of hardcopy images.

Figure 1:
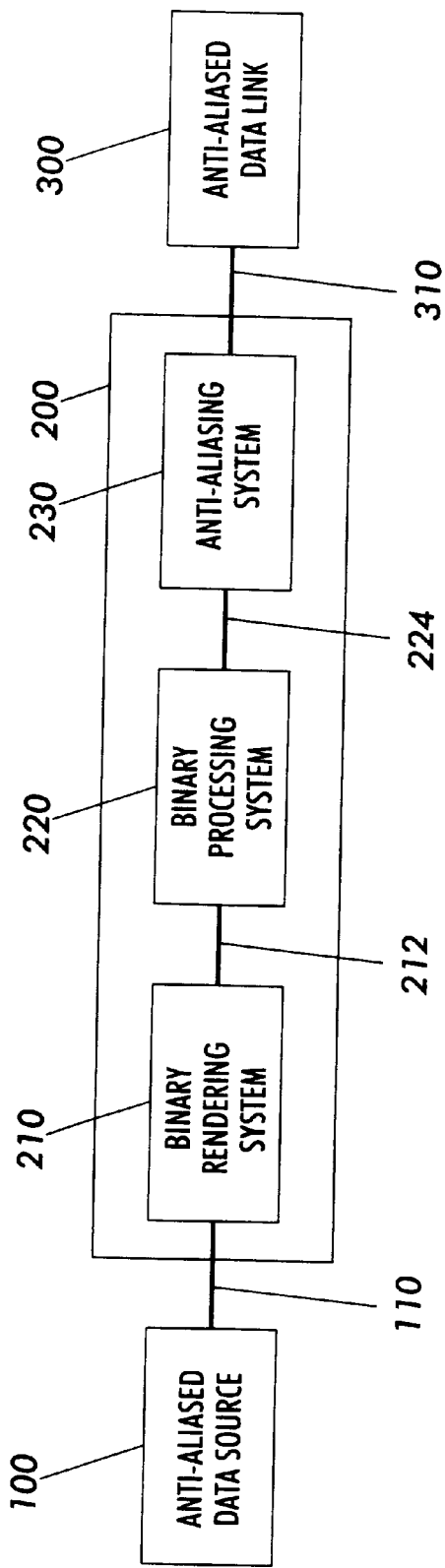
FIG. 1 is a block diagram of an exemplary embodiment of the systems for processing anti-aliased image data according to this invention.

FIG. 1 is a generalized functional block diagram of one exemplary embodiment of a digital imaging system 200 for operating on anti-aliased image data according to this invention. The digital imaging system 200 inputs anti-aliased image data from an anti-aliased data source 100 and outputs processed anti-aliased image data to an anti-aliased data sink 300.

The anti-aliased data source 100 can be any known or later developed device or system that is capable of providing anti-aliased image data to the digital imaging system 200. Similarly, the image data sink 300 can be any known or later developed device or system that is capable of receiving the processed anti-aliased image data output by the digital imaging system 200 and either storing, transmitting, or displaying the processed anti-aliased image data.

In general, the image data source 100 can be any one of a number of different sources, such as a scanner, a digital copier, a facsimile device that is suitable for generating electronic image data, or a device suitable for storing and/or transmitting electronic image data, such as a client or server of a network, of the Internet, and especially the World Wide Web. For example, the image data source 100 may be a scanner, or a data carrier such as a magnetic storage disk, CD-ROM or the like, or a host computer, that contains scanned image data.

In general, the image data sink 300 can be any device that is capable of outputting or storing the processed image data generated according to the systems and methods according to this invention, such as a printer, a copier or other image forming devices, a facsimile device, a display device, a memory, or the like.

The input anti-aliased image data is provided by the anti-aliased data source 100 to the digital imaging system 200 through a link 110. Similarly, the processed anti-aliased image data is provided from the digital imaging system 200 to the image data sink 300 through a link 310. The links 110 and 310 can be any known or later developed devices, software utilities or systems for connecting the digital imaging system 200 to the anti-aliased data source 100 or the anti-aliased data sink 300, including direct cable connections, connections over a wide area network or a local area network, connections over an intranet or an extranet, connections over the Internet, or connections over any other known or later-developed distributed processing network or system.

The digital imaging system 200 comprises a binary rendering system 210, a binary processing system 220 and an anti-aliasing system 220. The binary rendering system 210 receives data from the anti-aliased data source 100 over the link 110 and converts the anti-aliased image data into high resolution binary image data. For example, the binary rendering system 210 may input anti-aliased image data defining a three-hundred (300) spot-per-inch (spi) anti-aliased image from the anti-aliased data source 100. The binary rendering system 100 converts the input anti-aliased image data into twenty-four hundred (2400) spi binary image data. In this exemplary embodiment, the binary rendering system 210 processes two-dimensional data with symmetric resolution, e.g., three hundred (300) spi by three-hundred (300) spi images. However, it should be appreciated that the binary rendering system 210 may accommodate non-symmetric image data, such as three-hundred (300) spi by six-hundred (600) spi image data. Furthermore, the binary rendering system 210 may input symmetric or non-symmetric image data and produce high resolution binary images with symmetric or non-symmetric resolution.

In this exemplary embodiment of the digital imaging system 200, the binary rendering system 210 converts anti-aliased source images to high resolution binary images using a binary rendering process. The binary rendering process can be any known or later developed process or technique that converts anti-aliased image data to a binary form. In the exemplary embodiment of the digital imaging system 200, the binary rendering process is used by the binary rendering system 200 to generate estimated original binary image data that approximates the original binary image that was used to generate the input anti-aliased image data.

In various exemplary embodiments of the binary rendering system 210, the binary rendering system 210 can use any of the various anti-aliased rendering (AAR) techniques disclosed in U.S. patent application Ser. Nos. 09/192,900, 09/348,871, 09/046,414 and 09/348,378 each incorporated herein by reference in its entirety. It should be appreciated that any of these techniques can be applied to produce binary image data, typically high resolution in two dimensions. However, any known or later developed rendering process or techniques usable to convert an anti-aliased data to high resolution binary image data may be used without departing from the spirit and scope of the invention.

Once the binary rendering system 210 generates a high resolution binary image, the binary rendering system 210 passes the high resolution binary image to a binary processing system 220 over a link 212. The binary processing system 220 applies any number of known or later developed binary image processing techniques to the high resolution binary image data to produce processed high resolution binary image data. The image processing techniques usable by the binary rendering system 200 include processes such as, but not limited to, template matching, morphological filters, Boolean logic filters, threshold convolution or correlation, image filtering, or other binary operations. For example, line width control and document cleaning may be accomplished using template matching. Operations to control line width and remove noise, including template matching, are explained in detail by Loce and Dougherty, "Enhancement And Restoration Of Digital Documents" (1997). It should be appreciated that any other useful process or transform now known or later developed may be used by the binary processing system 220 without departing from the spirit and scope of the invention.

The processed high resolution binary image data produced by the binary processing system 220 is then transferred to an anti-aliasing system 230 over a link 224. The anti-aliasing system 230 converts the processed high resolution binary image data to output anti-aliased image data. In various exemplary embodiments, the resolution of the anti-aliased image data generated by the anti-aliasing system 230 can be predetermined. Typically, the output anti-aliased image data has a lower resolution that the resolution of modified processed high resolution binary image data. However, the anti-aliased image data could have a resolution that is higher than the resolution of the high resolution binary image data.

In various exemplary embodiments of the digital imaging system 200, the anti-aliasing system 230 uses an averaging technique to convert the processed high resolution binary image data to anti-aliased image data. However, anti-aliasing can be performed by data convolution or filtering followed by scaling or resampling to yield coarser anti-aliased image data. Other anti-aliasing techniques, such as, for example, multi-level halftoning processes and auto-segmentation techniques can be used in place of, or in addition to, these techniques. In general, any combination of known or later developed anti-aliasing techniques may be used without departing from the spirit and scope of the invention.

After the anti-aliasing system 230 transforms the modified high resolution binary image data to output anti-aliased image data, this anti-aliased image is output to the anti-aliased data sink 300 over the link 310.

Although the binary rendering system 210, the binary processing system 220 and the anti-aliasing system 230 are shown as physically separate systems, it should be understood that these systems, along with the links that connect them, may be different functional or structural aspects of a single device. Additionally, the digital imaging system 200 may be a stand-alone device or may be incorporated into the hardware and/or software of other devices including, but not limited to, personal computers, scanners, modem, printers, print engines and file servers. Finally, the different systems of the digital imaging system 200 according to this invention need not reside at the same location but may reside at different locations throughout a data network.

Figure 2:
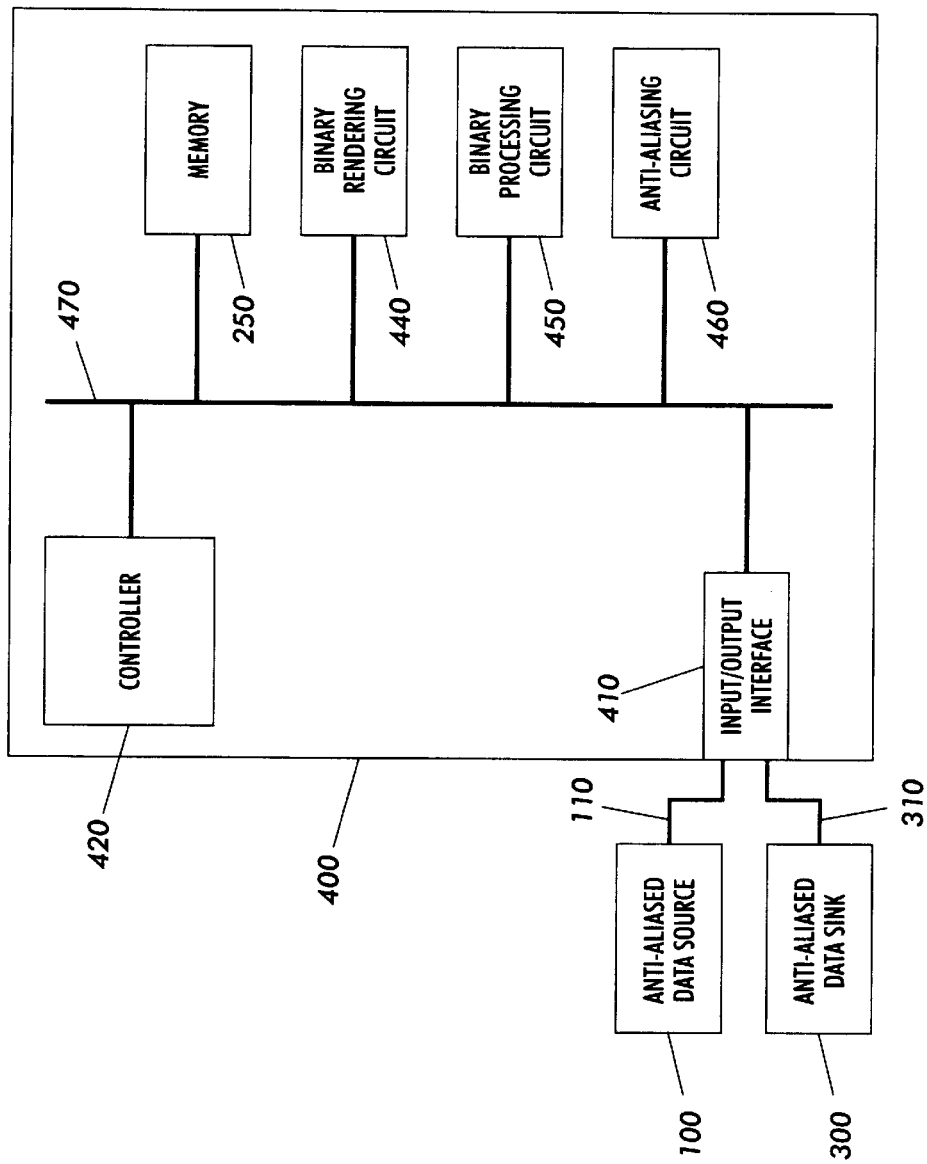
FIG. 2 is a block diagram of a second exemplary embodiment of the systems for processing anti-aliased image data.

FIG. 2 is a block diagram of a second exemplary embodiment of the systems for processing anti-aliased image data according to this convention. As shown in FIG. 2, an anti-aliased image data processing system 400 is connected to the anti-aliased image data source 100 and the anti-aliased image data sink 300 over the links 100 and 310.

The anti-aliased image data processing system 400 includes an input/output interface 410, a controller 420, a memory 430, a binary rendering circuit 440, a binary processing circuit 450, and an anti-aliasing circuit 460, each interconnected by a data control bus 470. The links 110 and 310 are connected to the input/output interface 410.

The memory 430 stores the anti-aliased image data and/or the high resolution binary image data that is either input by the anti-aliased image data processing system 400 and/or generated by the anti-aliased image data processing system 400 during image processing. The binary rendering circuit 440 inputs, under control of the controller 420, anti-aliased image data stored in the memory 430. The binary rendering circuit 440 transforms the input anti-aliased image data into high resolution binary image data. The binary rendering circuit 440 then, under control of the controller 420, either transfers the generated high resolution binary image data to the memory 430 or transfers the generated high resolution binary image data to the binary processing circuit 450.

The binary processing circuit 450, under control of the controller 420, inputs the generated high resolution binary image data either from the memory 430 or the binary rendering circuit 440. The binary processing circuit 450 generates processed high resolution binary image data from the input high resolution binary image data using any known or later developed binary image processing technique, such as those described above. The binary processing circuit 450 outputs, under control of the controller 420, the processed high resolution binary image data to the memory 430. Alternatively, the binary processing circuit 450 outputs, under the control of the controller 420, the processed high resolution binary image data directly to the anti-aliasing circuit 460.

The anti-aliased circuit 460 inputs, under control of the controller 420, the processed high resolution binary image data from either the memory 430 or the binary processing circuit 450. The anti-aliasing circuit 460 converts the processed high resolution binary image data to anti-aliased image data. As discussed above with respect to the anti-aliasing system 230, in various exemplary embodiments of the anti-aliased image data processing system 400, the resolution of the anti-aliased image data generated by the anti-aliasing circuit 460 can be predetermined.

The anti-aliasing circuit 460 then, under control of the controller 420, either transfers to the memory 430 or directly outputs the generated anti-aliased image data through the input/output interface 410 to the anti-aliased image data sink 300 over the link 310. If the generated anti-aliased image data is first stored in the memory 430, the generated anti-aliased image data can be output at any desired time from the memory 430 under control of the controller 420 to the anti-aliased image data sink 300 through the input/output interface 410 and over the link 310.

The digital processing system 200 and the anti-aliased image processing system 400 can perform a wide variety of useful image processing operations. As anti-aliased line art becomes increasingly available to the printing industry, operations such as line width control and modification become increasingly useful. Other problems encountered in the past in processing high quality binary line art will also occur for anti-aliased line art. For example, binary template matching filters have traditionally addressed problems such as darkness control, document cleaning, removal of point noise and holes and image enhancement. By converting anti-aliased images to binary representations, a large variety of operations solving the above-mentioned problems for binary line art become available for anti-aliased line art.

Figure 3:
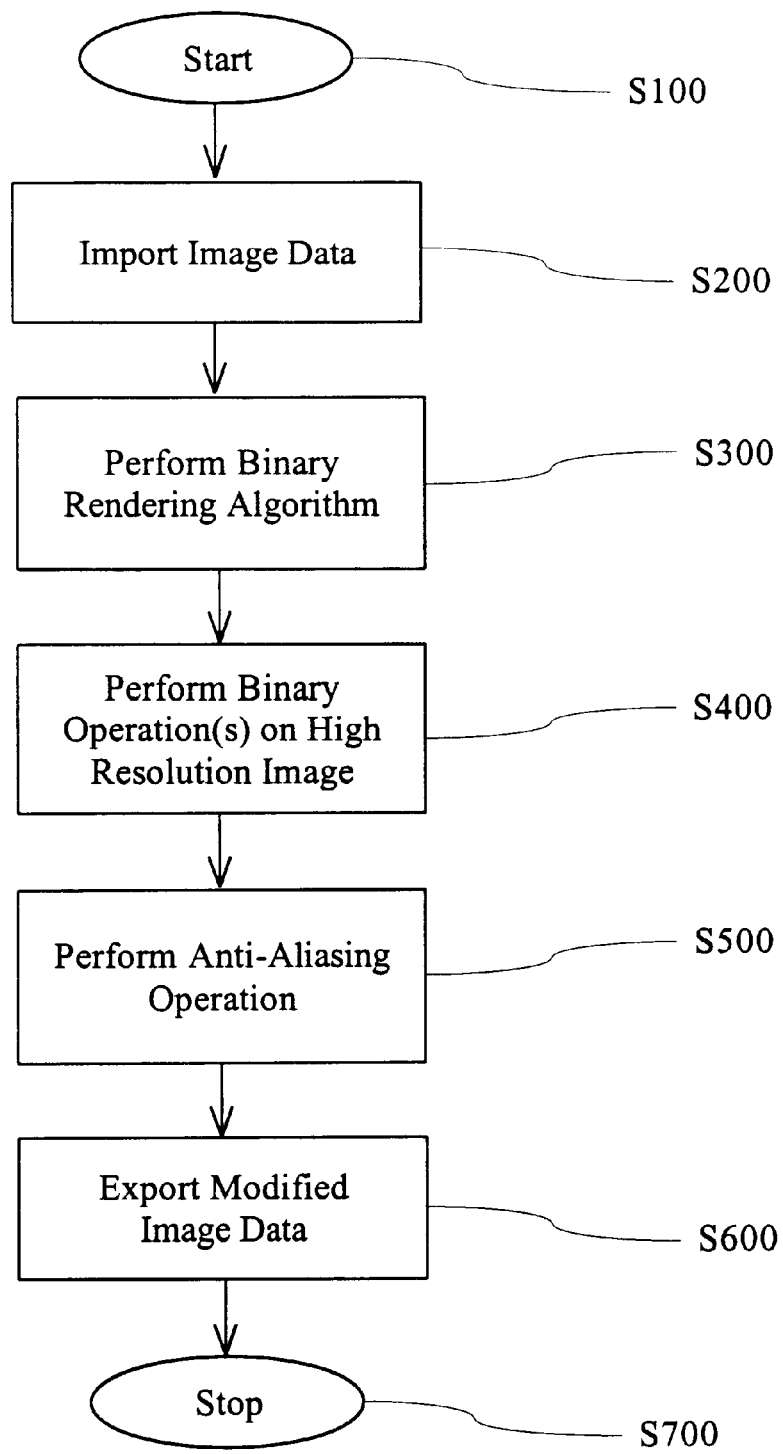
FIG. 3 is a flowchart outlining one exemplary embodiment of the methods for processing anti-aliased image data according to this invention.

FIG. 3 is a flowchart outlining an exemplary operation used to process anti-aliased images. Beginning in step S100, control continuous to steps S200, where an anti-aliased source image is input. Next, in step S300, the anti-aliased source image is converted to a high resolution binary image. As discussed above, any known or later developed process capable of converting a anti-aliased image to a high resolution binary image may be used without departing from the spirit or scope of the invention. Control then continues to step S400.

In step S400, the high resolution binary image is converted to processed high resolution binary image. Again, as stated above, any combination of one or more image processing techniques usable to process a high resolution binary image may be used to convert the high resolution binary image to a processed high resolution binary image. Likewise, as discussed above, any known or later developed image processing technique may be used without departing from the spirit and scope of the invention.

Then, in step S500, the processed modified high resolution binary image is converted to an output anti-aliased image. As stated above, any number of one or more known or later developed anti-alias data rendering techniques may be used without departing from the spirit and scope of the invention. The resolution of the output image may or may not be the same as the resolution as the input image, depending on the format of the input image and the requirements of an image data sink.

Next, in step S600, the output anti-aliased image is output to the image data sink. Then, in step S700, the process stops.

In the exemplary embodiment shown in FIG. 1, the digital processing system 200 is implemented on a programmed micro-controller and peripheral integrated circuit elements. However, the digital processing system 200 can also be implemented on a general purpose computer, a special purpose computer, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the digital processing system of FIG. 1 or the flowchart of FIG. 3 can be used to implement the digital processing system 200.

In the exemplary embodiment shown in FIG. 2, the anti-aliased image processing system 400 is implemented on a programmed general purpose computer. However, the anti-aliased image processing system 400 can also be implemented on a special purpose computer, a programmed microprocessor or microcontroller and peripheral integrated circuit elements, an ASIC or other integrated circuit, a digital signal processor, a hardwire electronic or logic circuit such as discrete element circuit, a programmable logic device such as PLD, PLA, FPGA or PAL, or the like. In general, any device, capable of implementing a finite state machine that is in turn capable of implementing the flowchart shown in FIG. 3, can be used to implement the anti-aliased image processing system 400.

As shown in FIG. 2, the memory 430 is preferably implemented using static or dynamic RAM. However, the memory 430 can also be implemented using a floppy disk and disk drive, a writable optical disk and disk drive, a hard drive, flash memory or the like.

It should be understood that each of the circuits shown in FIGS. 1 and 2 can be implemented as portions of a suitably programmed general personal computer. Alternatively, each of the circuits shown in FIGS. 1 and 2 can be implemented as physically distinct hardware circuits within an ASIC, or using a FPGA, a PLD, a PLA or a PAL, or using discrete logic elements or discrete circuit elements. The particular form each of the circuits shown in FIGS. 1 and 2 will take is a design choice and will be obvious and predictable to those skilled in the art.

Moreover, the digital image processing systems 200 and/or 400 can be implemented as software executing on a programmed general purpose computer, a special purpose computer, a microprocessor or the like. In this case, the digital imaging processing systems 200 and/or 400 can be implemented as a routine embedded in a printer driver, as a resource residing on a server, or the like. The digital image processing systems 200 and/or 400 can also be implemented by physically incorporating it into a software and/or hardware system, such as the hardware and software systems of a printer or a digital photocopier.

Figure 4:
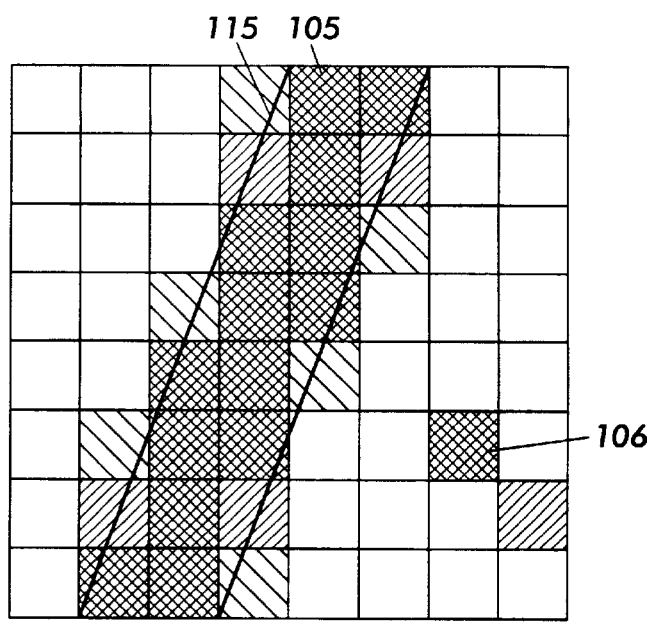
FIG. 4 depicts an anti-aliased digital image.

FIGS. 4–7 depict a simple image processed using the exemplary digital imaging systems and methods according to this invention. In particular, FIG. 4 shows an input anti-aliased slanted line 105 at a two-hundred and forty (240) spi resolution superimposed against an ideal slanted line 115 and accompanied by input noise 106.

Figure 5:
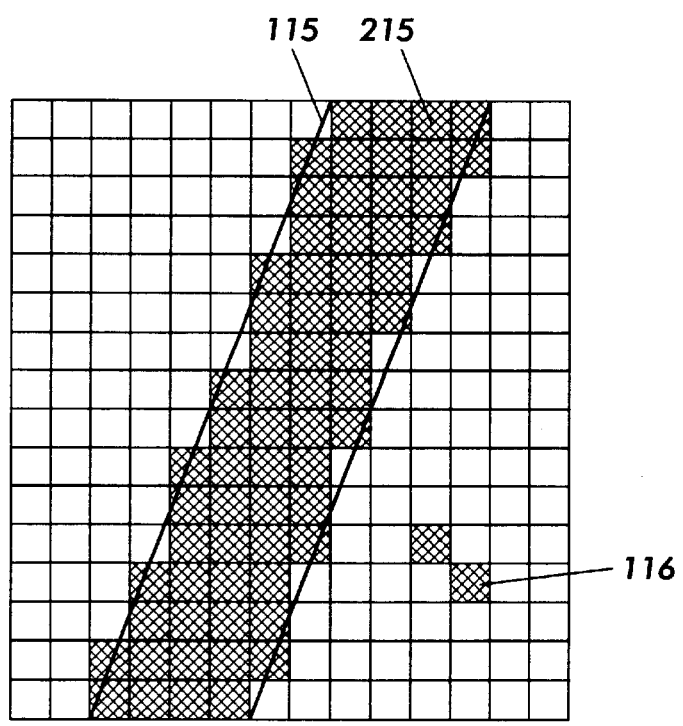
FIG. 5 depicts a high resolution binary image produced from the anti-aliased image shown on FIG. 4 using the system and methods according to this invention.

FIG. 5 depicts a high-resolution binary line 215 derived from the input anti-aliased slanted line 105 of FIG. 4 using the systems and method according to this invention. The input noise 120 of FIG. 4 has likewise been transformed to binary noise 216.

Figure 6:
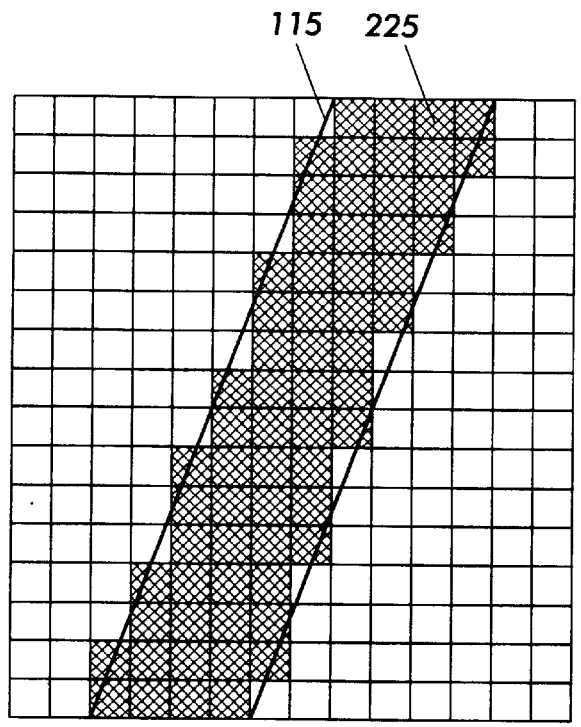
FIG. 6 depicts a processed high resolution binary image from the high resolution binary image shown on FIG. 5 using the systems and methods according to this invention.

FIG. 6 depicts the image of FIG. 5 after applying a spot noise removal technique to the image data shown in FIG. 5 using the systems and methods according to this invention. The high-resolution binary line 215 remains unaffected, producing an identical modified high-resolution binary line 225. However, the binary noise 216 has been removed.

Figure 7:
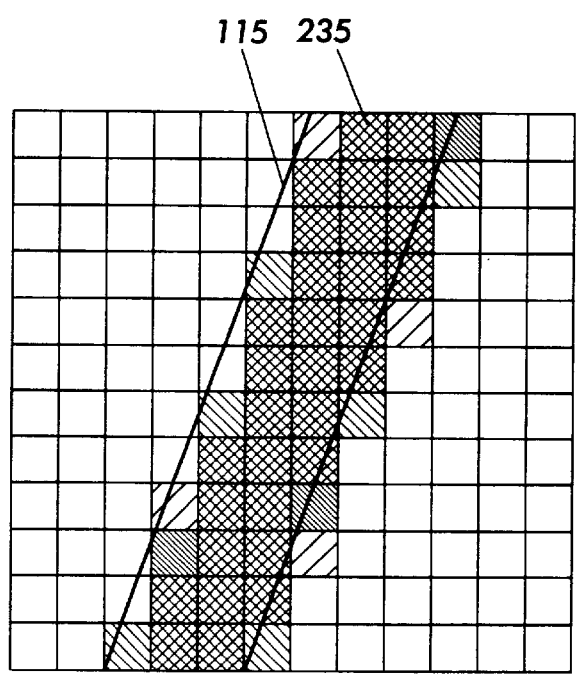
FIG. 7 depicts a anti-aliased image produced from the processed high resolution binary image using the systems and methods according to this invention.

FIG. 7 depicts a 300 spi anti-aliased line 235 derived from the modified high-resolution binary line 225 using the systems and method according to this invention.

Although the various exemplary embodiments of the systems and methods according to this invention are described above as processing gray-scale continuous tone (contone) image data, it should be understood that the systems and methods of this invention can be used with color images.

While this invention has been described in conjunction with the exemplary embodiments outlined above, it is evident that many alternatives, modifications and variation s will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for processing anti-aliased images comprising:
   converting an anti-aliased input image to a high resolution binary image;
   processing the high resolution binary image to produce a second high resolution binary image; and
   converting the second high resolution binary image to a second anti-aliased image, wherein processing the high resolution binary image to produce a second high resolution binary image includes at least one of line width control, document cleaning, and noise and hole removal on the high resolution binary image.

2. The method of claim 1, wherein a resolution of the second anti-aliased image is the same as a resolution of the anti-aliased second or anti-aliased image.

3. The method of claim 1, wherein a resolution of the second anti-aliased image is different than a resolution of the anti-aliased image.

4. The method of claim 1, wherein the anti-aliased input image produced using a computer processing technique.

5. The method of claim 1, wherein the anti-aliased input image produced from scanning a hardcopy image using a scanner.

6. The method of claim 1, wherein the anti-aliased input image includes text data.

7. The method of claim 1, wherein the anti-aliased input image includes graphics data.

8. The method of claim 1, wherein the anti-aliased input image includes contone image data.

9. An image processing apparatus, comprising:
   a first converter that converts an anti-aliased image to a high resolution binary image;
   a binary image processor that generates a second high resolution binary image from the high resolution binary image;
   a second converter that converts the second high resolution binary image to a second anti-aliased image, wherein binary image processor produces at least one of line width control, document cleaning, and noise and hole removal on the high resolution binary image.

10. The image processing apparatus of claim 9, wherein a resolution of an anti-aliased input image is the same as a resolution of the second anti-aliased image.

11. The image processing apparatus of claim 9, wherein a resolution of an anti-aliased input image is different than the resolution of the second anti-aliased image.

12. The image processing apparatus of claim 9, wherein the anti-aliased input image is produced using a computer processing technique.

13. The image processing apparatus of claim 9, wherein the anti-aliased input image is produced from scanning a hardcopy image using a scanner.

14. The image processing apparatus of claim 9, wherein the anti-aliased input image includes text data.

15. The image processing apparatus of claim 9, wherein the anti-aliased input image includes graphics data.

16. The image processing apparatus of claim 9, wherein the anti-aliased input image includes contone image data.

* * * * *